R. G. LEDIG AND A. PAPINI.
ELECTROLYTIC WATER HEATER.
APPLICATION FILED FEB. 14, 1919.
1,358,377.
Patented Nov. 9, 1920.
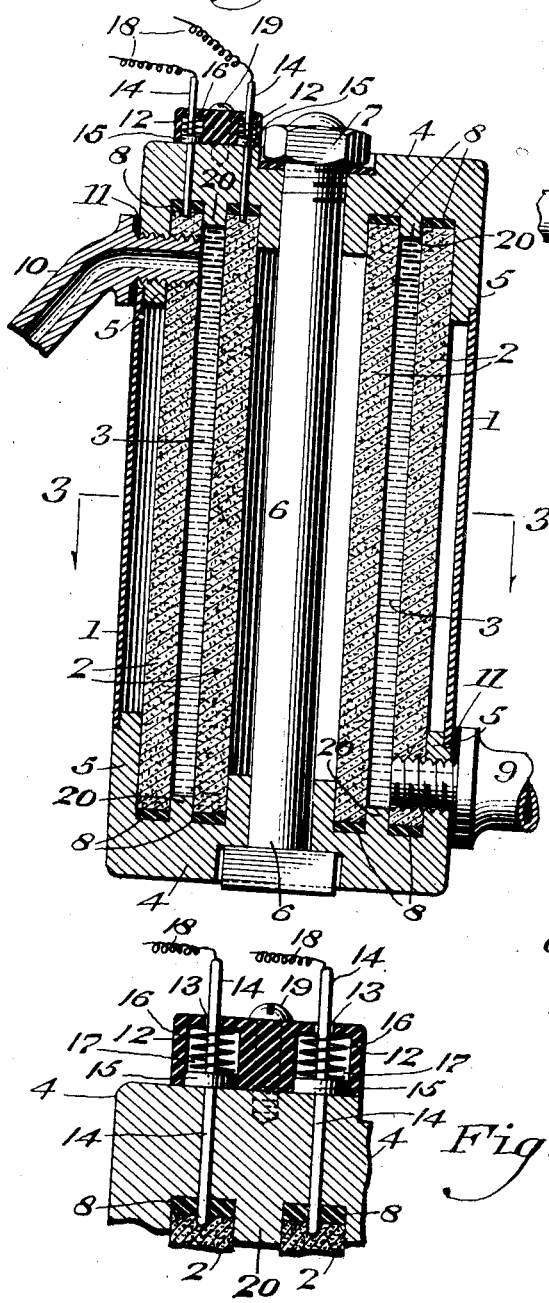
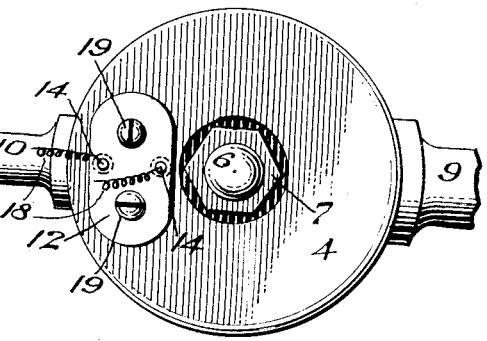
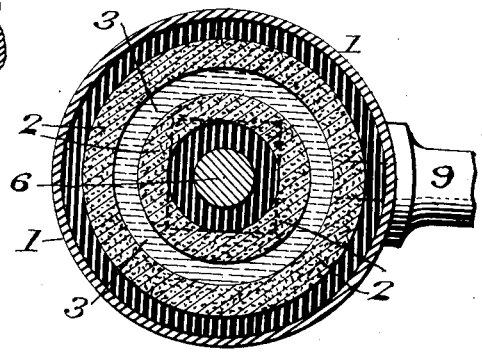
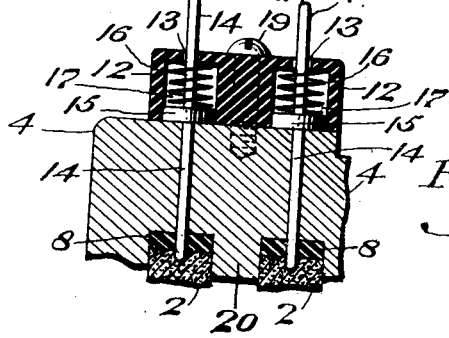

UNITED STATES PATENT OFFICE.

RICHARD G. LEDIG AND ANTONIO PAPINI, OF PHILADELPHIA, PENNSYLVANIA, ASSIGNORS TO A. MECKY COMPANY, OF PHILADELPHIA, PENNSYLVANIA, A CORPORATION OF PENNSYLVANIA.

ELECTROLYTIC WATER-HEATER.

1,358,377.

Specification of Letters Patent.    Patented Nov. 9, 1920.

Application filed February 14, 1919. Serial No. 276,905.

*To all whom it may concern:*

Be it known that we, RICHARD G. LEDIG, a citizen of the United States, and ANTONIO PAPINI, a subject of the King of Italy, having resided in the United States one year last past, and having declared my intention of becoming a citizen thereof, both residing in the city and county of Philadelphia, State of Pennsylvania, have invented a new and useful Electrolytic Water-Heater, of which the following is a specification.

Our invention consists of a water heater formed of a plurality of electrodes with a water chamber between the same, and means for energizing said electrodes whereby when water is supplied to said chamber it forms a resistance to the passage of the current which generates heat.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a central vertical section of an electrolytic water heater embodying our invention.

Fig. 2 represents a top or plan view thereof.

Fig. 3 represents a transverse horizontal section thereof on line 3—3 Fig. 1.

Fig. 4 represents a vertical section of a detached portion on an enlarged scale.

Similar numerals of reference indicate corresponding parts in the figures.

Referring to the drawings.

1 designates the exterior casing of the device, the same being formed of metal or other suitable material. Within said casing are the concentric electrodes 2 formed of carbon or other suitable material and tubular or cylindrical in form and having between them the space 3 forming a chamber to receive water to be heated.

On the ends of the electrodes are placed the caps 4 which close the same, they being of insulating material and having on their sides the undercuts or flanges 5 on which the ends of the casing 1 are seated. Passing through the caps and the central electrode is the bolt 6 which is provided with the nut 7 serving to bind together the electrodes, casing and caps, holding them tightly connected.

Interposed between the ends of the electrodes and the inner faces of the caps are washers, gaskets or cement forming the packings 8 to form water tight joints for for said electrodes and caps.

Screwed or otherwise secured to the side flange of the lower cap is the water supply pipe 9 which passes through the outer electrode and is in communication with the water space 3, said pipe being adapted to be connected with a source of water and direct it into said space.

Screwed or otherwise secured to the side flange of the upper cap is the pipe 10 which passes through the outer electrode and is in communication with the water space 3 so as to direct or discharge the water from the latter.

Said pipes 9 and 10 are suitably packed as at 11 to provide tight joints at relative places and prevent leakage thereat. On the upper cap is supported and secured the block 12 of insulating material, the same having therein the openings 13, through which are passed the pins 14 comprising poles whose lower ends passing through the packings 8 are fitted in openings in the upper ends of the electrodes 2, so as to be in electric communication with the latter. In order to retain said poles in operative position they are provided with shoulders 15, on which are seated the springs 16 which are adapted to press against said shoulders, and are also seated against the top wall of the block 12 so that the poles are forced downwardly into engagement with the electrodes, said shoulders and springs freely occupying the recesses 17 in the block 12.

The upper ends of said poles are connected with wires or conductors 18 leading from an electrical source of energy so as to electrically energize the electrodes 2. The block 12 is secured to the adjacent cap by the screws 19 or other suitable means.

It will be seen that the water in the chamber 3 between the electrodes forms a resistance to the passage of the current.

In order to retain the electrodes 2 in proper position to preserve the water receiving space or chamber 3, the inner faces of the caps have thereon the beads or ribs 20 which are adapted to project into the ends of the said chamber between the adjacent end portions of the electrodes as stops to control the electrodes against lateral shifting on the caps, the effect of which is evident.

Having thus described our invention what we claim as new and desire to secure by Letters Patent, is:—

A plurality of electrodes, one within the other and providing a water receiving chamber therebetween, a cap secured to each end of said electrodes, said caps being provided with depending spacing flanges receiving therebetween the ends of said electrodes, a casing for said electrodes connectible with said caps, means extending through said caps and the inner electrode and adapted to secure said electrodes and casing to said caps, a water inlet leading to said water receiving chamber, a water discharge outlet leading from said water receiving chamber, and poles in one of said caps adapted to resiliently and electrically contact with said electrodes.

RICHARD G. LEDIG.
ANTONIO PAPINI.

Witnesses:
 ALBERT E. PARKER,
 ALBERT MAYER.